US005446458A

United States Patent [19]

Chaumat et al.

[11] Patent Number: 5,446,458

[45] Date of Patent: Aug. 29, 1995

[54] PROCESS FOR THE FASTENING OF AN ELEMENT ABSORBING ELECTROMAGNETIC WAVES ON A WALL OF A STRUCTURE OR AN INFRASTRUCTURE

[75] Inventors: Jean-Pierre Chaumat, Grigny; Yves Larrere, Cerny, both of France

[73] Assignee: Societe Nationale des Poudres et Explosifs, Paris, France

[21] Appl. No.: 947,518

[22] Filed: Dec. 30, 1986

[30] Foreign Application Priority Data

Dec. 30, 1985 [FR] France ............................... 85 19377

[51] Int. Cl.⁶ ................................................ G01S 7/36

[52] U.S. Cl. ............................................ 342/1; 342/4

[58] Field of Search ......................................... 342/1–4

[56] References Cited

U.S. PATENT DOCUMENTS 3,427,619 2/1969 Wesch et al. .
3,454,947 7/1969 Wesch et al. .
3,599,210 8/1971 Stander .
4,024,318 5/1977 Forster et al. .
4,193,018 10/1979 Dawson et al. .
4,287,243 9/1981 Nielsen .
4,538,151 8/1985 Hatakeyama et al. .

*Primary Examiner*—Mark Hellner
*Attorney, Agent, or Firm*—Burns, Doane, Swecker & Mathis

[57] ABSTRACT

The invention pertains to a process to fasten an intrinsic element absorbing electromagnetic waves onto a wall of a structure or infrastructure.

The process of the invention consists of coating a surface of a wall of a structure by means of a syntactic foam with the rheologic properties of a mastic and being transparent to electromagnetic waves, then placing an element absorbing electromagnetic waves into or onto the syntactic foam coating, and letting the syntactic foam harden. The process can be used to place an element absorbing electromagnetic waves onto surfaces of any shape and in a simple manner without requiring special equipment.

7 Claims, 1 Drawing Sheet

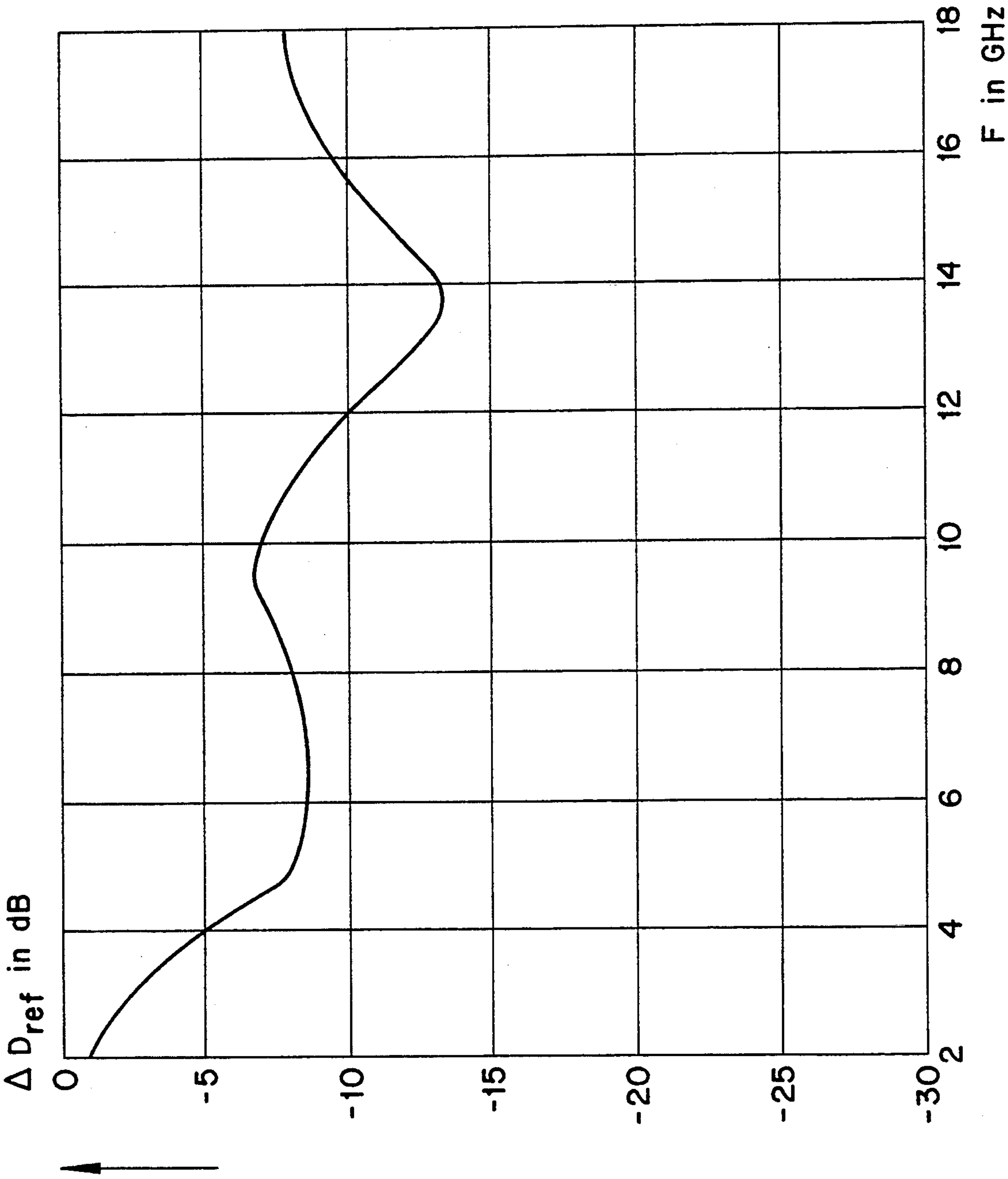
Δ Dref in dB
0
-5
-10
-15
-20
-25
-30
2
4
6
8
10
12
14
16
18
F in GHz

PROCESS FOR THE FASTENING OF AN ELEMENT ABSORBING ELECTROMAGNETIC WAVES ON A WALL OF A STRUCTURE OR AN INFRASTRUCTURE

BACKGROUND AND SUMMARY OF THE INVENTION

The invention pertains to the processes and materials used to reduce the reflection of electromagnetic waves off a wall of a structure or infrastructure.

It is more specifically designed for a process to fasten an intrinsic element absorbing electromagnetic waves onto a wall of a structure, moving or not, or an infrastructure.

There are known methods used to reduce the electromagnetic wave reflectivity of a structure or infrastructure and thereby reduce their radar signature. These methods are essentially and principally comprised of camouflage covers, such as nets covering the structure or infrastructure. Thus, a net made of material that absorbs electromagnetic waves is used, and this net is attached to the structure, for example, with fastening straps or cables. Such a method can be quite cumbersome to use, particularly for structures or infrastructures containing moving parts.

Other methods proposed were the use of rigid panels including a synthetic resin as the matrix with an imbedded element that absorbs electromagnetic waves. However, although perfectly suited to make infrastructures or to protect flat surfaces and simple shapes, these panels are very difficult to use for the protection of moving structures, or non-flat surfaces or complex shapes. Moreover, any damage to part of the panel is very difficult to repair and most often requires the replacement of the entire panel.

To correct these drawbacks, the invention proposes a process to fasten an intrinsic element absorbing electromagnetic waves such as a net, for example, onto a wall of a structure or infrastructure which will enable it to be attached simply and reliably to any surface of any shape, even by unspecialized persons, and to easily repair damaged parts with a simple sealing or filling of these parts.

Accordingly, the invention is designed for a process to fasten an intrinsic element absorbing electromagnetic waves onto a wall of a structure or infrastructure, characterized as follows in that it consists of:

applying a coating onto a surface of the aforesaid wall by means of a syntactic foam that is transparent to electromagnetic waves and that has the rheological properties of a mastic;

placing the aforesaid intrinsic absorbent element into or onto the aforesaid syntactic foam coating;

letting the aforesaid syntactic foam harden.

Of course, for the coating to adhere to the wall, it is usually necessary to clean the surface of the wall, namely by degreasing or sand blasting, for example; these operations are those that are normally conducted to prepare a surface prior to applying a coat of paint or applying any type of coating.

The syntactic foam is a composite material including as its matrix, a resin such as an epoxy resin, polyester, phenolic, silicone, for example, and a volume-reduction filler consisting of hollow or porous microspheres, such as, for example, microscopic particles of glass, plastic, zeolite, vermiculite, and having a low density.

BRIEF DESCRIPTION OF THE DRAWING

The single figure represents the variation of the reduction of reflectivity of a flat surface as a function of frequency of the electromagnetic waves.

DESCRIPTION OF THE PREFERRED EMBODIMENTS

These different syntactic foams that may be used for the invention shall preferably be those with a density less than or equal to 600 kg/m$^3$.

Preferably, the matrix of the syntactic foams suitable for the invention is made of a resin polymerizing at ambient temperature, and most advantageously at a temperature between approximately 18° C. and approximately 30° C. By selecting this resin, the coating can be hardened without requiring a thermal process and a costly facility.

In addition, to obtain (working) pot lives that are compatible with implementation of the process, it is preferable to use a system with two components, a component A containing the resin filled with the microscopic particles and various additives, if any, and a component B containing the resin hardening agent.

The systems suitable for the invention are those that offer a (working) pot life on the order of approximately 2 hours or longer pot life. In effect, this length of time is long enough for an application of the coating onto the wall and setting the absorbing element before the syntactic foam hardens.

The duration of polymerization of the syntactic foam is not critical, but the preferred systems have a polymerization duration on the order of 24 to 48 hours at ambient temperature.

As additives, the following can be used, for example, dyes, texture agents, structural fillers that do not conduct electricity, viscosity modifiers, or agents that promote bonding.

Moreover, the syntactic foams suitable for the invention must be transparent to electromagnetic waves, and therefore possess the following dielectric properties:

permittivity less than 2 dielectric loss factor less than $5\times10^{-2}$

Any element absorbing electromagnetic waves that is intrinsic, i.e., which can itself form an absorbent surface capable of reducing the reflectivity of a wall, is suitable for the invention. The following can be listed as absorbent elements marketed in the form of nets, felt, fabric, reticulate foam, or unwoven fabric. As an example, there are the absorbent nets sold by the company PLESSEY under the names ENA-1, or LAO.

The wall onto which the absorbent coating is applied must reflect electromagnetic waves. However, this property can be obtained simply with a layer or a reflecting element forming this wall, specifically in the case of a composite wall, or, for example, with a reflecting coating alone.

Hence, the layer or reflecting element may be, for example, a composite material such as carbon-epoxy or metallic composites, metallic fabrics, metal-resin composite, or a reflecting paint.

According to the invention, it is possible, preferably after hardening the syntactic foam, to coat the surface of the resultant coating with paint or any other protective layer.

The invention is especially useful to make coatings that absorb electromagnetic waves with a frequency of over 2 GigaHertz (GHz), preferably between 6 GHz and 100 GHz, and most advantageously between 6 and 40 GHz.

According to another characteristic of the invention, an additional layer of syntactic foam may be applied after setting the intrinsic element, thereby completely embedding that element in the syntactic foam. This additional layer is also designed to protect the intrinsic element from exterior forces.

The thickness of the layer or layers of syntactic foam is not critical, but should preferably be as thin as possible, to be compatible with the conditions of use of the treated structure.

To improve the adherence of the syntactic foam onto the wall to be coated, it is possible to either add a bond-promoting additive to the foam, or to coat the surface of the wall with an adhesive called a "primary" consisting, for example, of an epoxy resin.

The invention will be better illustrated in light of the example below and the attached figure both given on an indicative basis only, and other advantages, details, and purpose of the invention will appear more clearly.

The coating of a metallic wall is performed with an element absorbing electromagnetic waves, according to the invention process.

For this, after sand blasting and cleaning, specifically degreasing the wall exposed to the electromagnetic waves, this surface is coated with a thin layer of adhesive, an epoxy resin: the resin Redux 410 sold by MAPROCHIM.

In a second phase, a syntactic foam is prepared by mixing the two components of the foam with epoxy resin matrix and glass microscopic particles marketed by the company Hexcel, under the name "Rezomix 114/L"

| | |
|---|---|
| component A: | 100 parts by weight |
| component B (hardening agent): | 40 parts by weight |

A paste is obtained with viscosity ranging between 100 P and 200 P, density on the order of 58 kg/m$^3$. The pot life at 20° C. of the resulting mixture is on the order of 5 hours.

This paste is applied to the surface of the wall by any customary processes, and namely the technique of base coating the wall. A net absorbing electromagnetic waves is then placed onto the surface of the syntactic foam already applied. This net is sold by the company Plessey under the name ENA-1. After this operation, a new layer of syntactic foam is applied following a technique similar to that used for the application of the first layer.

It is then left to harden at ambient temperature (20° C.) for 48 hours.

The effectiveness of the coating made in this manner is tested by measuring, at different frequencies, the reduction of reflectivity of the wall compared with a non-coated metal. The measurements obtained are illustrated in the single figure which represents the variation of the reduction of reflectivity Drefl of a flat surface in dB as a function of frequency F of the electromagnetic waves expressed in GHz.

The process of the invention is simple to perform and does not require any particular technical know-how on the part of the person performing the coating.

Moreover, since the syntactic foam can be obtained by a simple mixture of two components, this coating can be done anywhere and does not require any special equipment.

In addition, if part of the coating is damaged, it can be easily repaired by sealing or puttying of the damaged part-this repair can even be performed by an unskilled person.

The coating process of this invention, in addition to providing the property of reducing reflectivity of the wall, also offers a heat-insulating coating.

It is also clear that it is possible to coat any surface of any shape because of the use of a paste or mastic. This results in the capability of an unskilled person to perform the coating operation without special equipment, and also the mobility or the use of the coated structure is not affected. Moreover, since a syntactic foam is used, this coating does not entail an overloaded weight for the structure.

We claim:

1. Process to fasten an intrinsic element absorbing electromagnetic waves onto a wall of a structure or infrastructure, which process comprises:

applying a coating onto a surface of the aforesaid wall by means of a syntactic foam that has the rheological properties of a mastic, and that is transparent to electromagnetic waves, placing the aforesaid intrinsic absorbent element into or onto the aforesaid syntactic foam coating, letting the aforesaid syntactic foam harden.

2. Process as per claim 1, wherein the hardening of the syntactic foam is conducted at a temperature between 18° C. and 30° C.

3. Process as per one of the claims 1 or 2, wherein the syntactic foam has a permittivity of less than 2 and a dielectric loss factor less than $5\times10^{-2}$.

4. Process as per one of the preceding claims, wherein an additional, exterior layer of syntactic foam is applied onto the aforesaid coating after the aforesaid intrinsic element is in place.

5. Process as per one of the preceding claims, which process further comprises, prior to the syntactic foam coating operation, of coating the surface with an adhesive.

6. Process as per one of the preceding claims, wherein the aforesaid syntactic foam contains additives, such as, dyes, texture agents, structural fillers that do not conduct electricity.

7. Process as per one of the preceding claims, wherein the exterior surface of the aforesaid coating is, after hardening, coated with a protective layer.

* * * * *